United States Patent [19]

Mitsuishi

[11] Patent Number: 4,496,020

[45] Date of Patent: Jan. 29, 1985

[54] V-TYPE MULTI-CYLINDER ENGINE FOR MOTORCYCLE

[75] Inventor: Toshiro Mitsuishi, Tokorozawa, Japan

[73] Assignee: Honda Giken Kogyo Kabushiki Kaisha, Tokyo, Japan

[21] Appl. No.: 452,431

[22] Filed: Dec. 23, 1982

[30] Foreign Application Priority Data

Dec. 26, 1981 [JP] Japan ................. 56-209518

[51] Int. Cl.³ .............. B62D 61/02; F16F 15/26
[52] U.S. Cl. ..................... 180/219; 74/603; 74/604; 123/54 R; 123/192 R; 123/192 B
[58] Field of Search ............. 180/229, 225, 219, 218; 123/59 R, 53 A, 53 R, 53 B, 54 R, 55 V, 55 VF, 56 B, 192 R, 192 B; 74/359, 606 R, 603, 604, 49

[56] References Cited

U.S. PATENT DOCUMENTS

| | | | |
|---|---|---|---|
| 754,929 | 3/1904 | Lepape | 180/219 X |
| 1,639,165 | 8/1927 | Burtnett | 123/53 A |
| 2,194,022 | 3/1940 | Kitzeman | 123/53 A |
| 4,194,469 | 3/1980 | Kruger | 123/55 VS X |
| 4,321,978 | 3/1982 | Tominaga et al. | 123/55 VF X |
| 4,370,953 | 2/1983 | Van de Walker | 123/55 VS |

FOREIGN PATENT DOCUMENTS

81250  5/1983  Japan ................. 123/192 B

Primary Examiner—Joseph F. Peters, Jr.
Assistant Examiner—Mitchell J. Hill
Attorney, Agent, or Firm—Armstrong, Nikaido, Marmelstein & Kubovcik

[57] ABSTRACT

Disclosed is an engine for motorcycles, having first and second engine blocks disposed in a form like V on the frame of the motorcycle. Pistons reciprocatably and slidably received in the engine blocks are connected to first and second crank pins of a crankshaft through respective connecting rods. Representing the included angle between the central axes of first and second cylinders for the first and second piston by $\alpha$, the rotational phase of the second crank pin is offset from that of the first crank pin by an angle $\pi - 2\alpha$ in the opposite side of the central axis of the first cylinder to the central axis of the second cylinder. A balancer weight is attached to that portion of the crank shaft positioned opposite to the first and second crank pins and on the bisector line of the angle formed between the first and second crank pins. With this arrangement, the primary inertia force as applied to the crankshaft by the mass of reciprocating parts such as pistons can be substantially eliminated to remarkably suppress the vibration of the engine.

10 Claims, 6 Drawing Figures

V-TYPE MULTI-CYLINDER ENGINE FOR MOTORCYCLE

BACKGROUND OF THE INVENTION

Brief Description of the Invention

The present invention relates to a V-type multicylinder engine for motorcycles, and more particularly to an engine having a plurality of cylinders disposed in a V shape and a crankshaft common to those cylinders.

Description of the Prior Art

When mounting the aforementioned V-type multicylinder engine to a motorcycle, an attempt has hitherto been made to alleviate the vibration of a crankshaft as well as a chassis by eliminating the first term of ill-balanced intertia force applied to the common crankshaft by the mass of reciprocating parts such as pistons and the like, which parts reciprocate in cylinders, by disposing the cylinders in a form like V with an included angle 90° therebetween and by attaching an appropriate balancer weight to the crankshaft.

However, in the case where the included angle between cylinders is made smaller than 90° for reduction of the engine disposing space, when pistons reciprocating in a plurality of cylinders are connected to a common crank pin of the crankshaft via connecting rods, it was impossible to eliminate the primary term of the ill-balanced inertia force resulting from the aforementioned mass of the reciprocating parts even by attaching a balancer weight to the crankshaft. Consequently, the vibration of the crankshaft, which is transmitted to the chassis, constituted a problem of unfavorably deteriorating the riding comfort of the rider.

SUMMARY OF THE INVENTION

It is, therefore, an object of the present invention to provide a compact V-type multi-cylinder engine for motorcycles of the type mentioned above designed to substantially reduce the vibration, thereby to eliminate the above-described problem of the prior art.

To this end, according to the invention, there is provided a V-type multi-cylinder engine including first and second engine blocks so arranged on a frame as to form a V shape and having first and second cylinders, respectively, pistons slidably fitted in the first and second cylinders, and a crankshaft having first and second crank pins connected to the first and second pistons via piston rods, wherein the improvement comprises that the rotational phase of the second crank pin is offset from that of the first crank pin by an angle $\pi - 2\alpha$ in the opposite side of the central axis of the first cylinder to the central axis of the second cylinder, $\alpha$ representing the included angle between the central axes of the first and second cylinders, and that a balancer weight is attached to that portion of the crankshaft positioned opposite to the first and second crank pins and on a bisector line of the angle formed between the first and second crank pins around the crankshaft.

The above and other objects, features and advantages of the present invention will be apparent from the following detailed description of a preferred embodiment when taken in conjunction with the accompanying drawings.

DESCRIPTION OF THE PREFERRED EMBODIMENT

An embodiment of the present invention will be described hereinunder with reference to the attached drawings.

Drawings show a motorcycle mounting a V-type multi-cylinder engine constructed in accordance with the present invention (a two-cylinder engine in the illustrated example).

Figure 1:
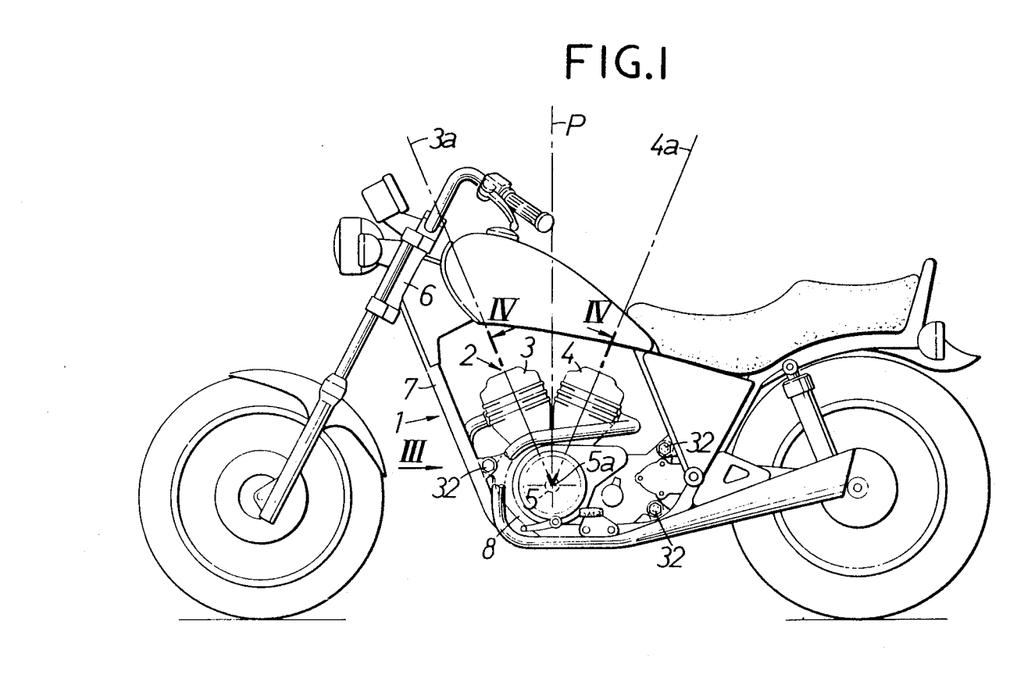
FIG. 1 is a side view of a motorcycle equipped with an engine in accordance with the present invention.

Referring first to FIG. 1, a two-cylinder engine 2 having a pair of engine blocks 3 and 4 mounted on a frame 1 of the motorcycle in such a manner as to form a V shape in the longitudinal direction of the chassis, and a common crankshaft 5 is disposed at right angles to the longitudinal direction of the chassis.

The engine 2 is disposed on the cradle-type frame, and the front cylinder block 3 of the engine 2 is arranged in such a way that its central axis 3a is substantially parallel with a downtube 7 extending from a head pipe 6 of the frame 1 downwardly towards the rear end of the chassis.

To reduce the length of the engine 2 in the longitudinal direction of the chassis, the front and rear engine blocks 3 and 4 are arranged such that the included angle between their central axes 3a and 4a becomes smaller than 90° (in the illustrated drawings, approximately 45°). Also, the front and rear engine blocks 3 and 4 are arranged so that the central axes 3a and 4a become symmetric, i.e., at equal angles, with respect to a vertical plane P passing the central axis of rotation of the crankshaft 5.

Figure 2:
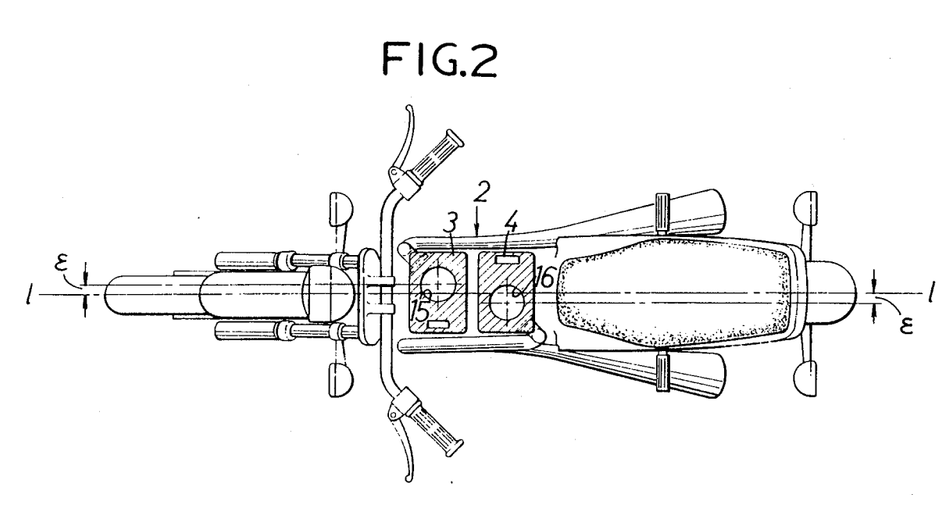
FIG. 2 is a partly-sectioned plan view of the motorcycle as shown in FIG. 1.
Figure 4:
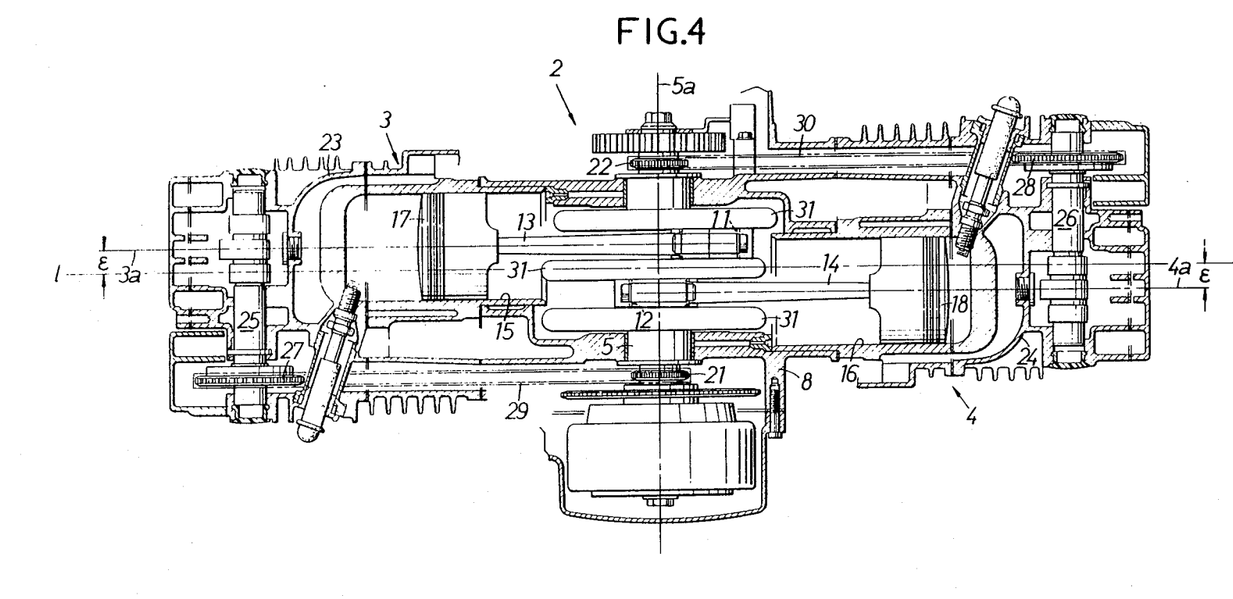
FIG. 4 is a cross sectional view taken along the lines IV—IV in FIG. 1.

As shown in FIG. 4, each of the front and rear engine blocks 3 and 4 is composed of front and rear cylinders 15 and 16, respectively, as well as front and rear cylinder heads 23 and 24 secured to the top side of the respective cylinders 15 and 16, the cylinders 15 and 16 being arranged symmetrically by offsetting their central axes 3a and 4a at a fixed distance $\epsilon$ toward both sides of the vertical central line l of the chassis, as shown in FIG. 2.

Figure 5:
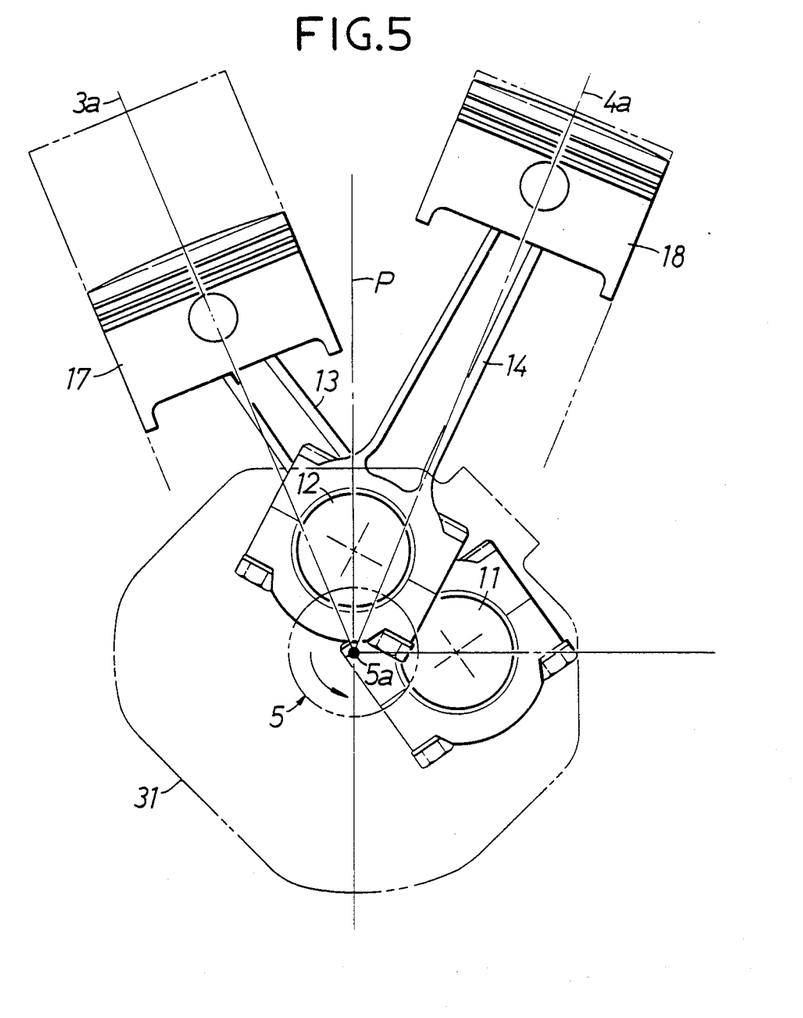
FIG. 5 is an enlarged side elevational view showing the general arrangement of pistons, connecting rods and crankshaft.

The crankshaft 5 is rotatably supported by a crank and transmission case 8 at a point of intersection between the central axes of the front and rear engine blocks, i.e., the central axes 3a and 4a of the front and rear cylinders 15 and 16. Pistons 17 and 18 slidably received by front and rear cylinders 15 and 16 are connected to first and second crank pins 11 and 12 of this crankshaft 5 via first and second connecting rods 13 and 14.

Driving sprockets 21 and 22 are fixed to both ends of the crankshaft 5. Driven sprockets 27 and 28 are fixed on the oppositely positioned sides of valve actuator camshafts 25 and 26, respectively, which camshafts 25 and 26 are rotatably supported on respective top portions of front and rear cylinder heads 23 and 24. Endless timing chain 29 goes round between the driving and driven sprockets 21 and 27 and another endless timing chain 30 between sprockets 22 and 28, so that the rotation of the crankshaft 5 is transmitted to the valve actuator camshafts 25 and 26 via the timing chains 29 and 30, respectively.

If the engine blocks 3 and 4 are disposed in such a way that the included angle $\alpha$ between the respective central axes 3a and 4a become smaller than 90°, as mentioned earlier, it is impossible to eliminate the primary term of inertia force resulting from the mass of reciprocating parts such as pistons 17 and 18 even by attaching a balancer weight to the crankshaft 5 in conventional cases where the pistons 17 and 18 inside the front and rear cylinders 15 and 16 are connected to the common crank pin of the crankshaft 5.

Therefore, in accordance with this invention, the primary term of this inertia force can be eliminated by connecting the first and second connecting rods 13 and 14 to separate crank pins 11 and 12 of the crankshaft 5 and by providing a phase differential between these crank pins 11 and 12 by a predetermined angle $(\pi - 2\alpha)$. The reason for this shall be explained hereinunder.

Figure 6:
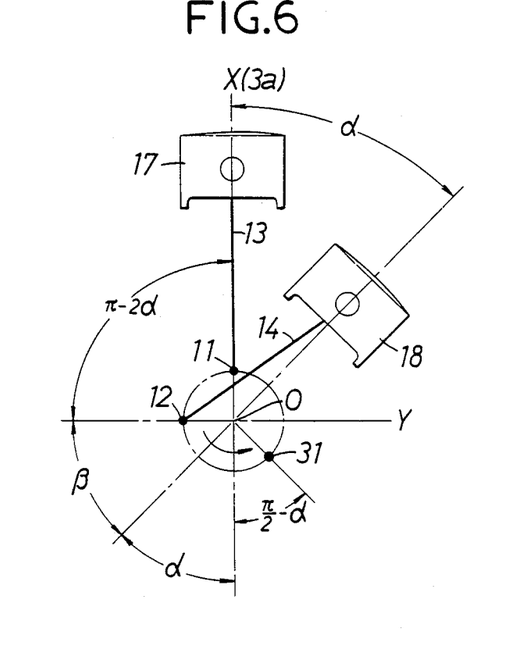
FIG. 6 is an explanatory drawing illustrating the principle of this invention.

First, if the central axis 3a of the front cylinder 15 is taken as the X axis and a straight line perpendicular to the central axis 3a and passing a point of intersection 0 between the central axes 3a and 4a of the front and rear cylinders 15, 16 as the Y axis, the component in the direction of the X axis of the primary inertia force, Fx, of the mass of the reciprocating parts such as pistons 17 and 18 can be obtained as the composite force of the X axis component Fxa of the primary inertia force chiefly produced by the piston 17 and the X axis component Fxb of the primary inertia force chiefly produced by the piston 18. In other words, $$Fx = Fxa + Fxb$$

$$Fxa = Ma \cdot ra \cdot \omega^2 \cdot \cos\theta$$

$$Fxb = Mb \cdot rb \cdot \omega^2 \cdot \cos(\theta + \pi - \beta)\cos\alpha$$

Where
  Ma: the mass of reciprocating parts, including the piston 17, imposed upon the first crank pin 11
  Mb: the mass of reciprocating parts, including the piston 18, imposed upon the second crank pin 12
  ra: the radius of rotation of the first crank pin 11
  rb: the radius of rotation of the second crank pin 12
  $\omega$: the angular velocity of the crankshaft 5
  $\theta$: the rotational angle of the first crank pin 11
  $\alpha$: the included angle between the central axes 3a and 4a of cylinders 15 and 16
  $\beta$: the angle formed between the second crank pin 12 and an extension of the central axis 4a of the cylinder 16 in the initial period of rotation ($\theta=0$)

Also, the component in the Y axis direction, Fy, of the primary inertia force of the mass Ma, Mb of reciprocating parts is obtained in terms of the composite force between the Y axis component Fya of the primary inertia force chiefly produced by the piston 17 and the Y axis component Fyb of the primary inertia force chiefly produced by the piston 18. In other words, $$Fy = Fya + Fyb$$
$$Fya = 0$$
$$Fyb = Mb \cdot rb \cdot \omega^2 \cdot \cos(\theta + \pi - \beta)\sin\alpha$$
$$\phantom{Fyb} = Mb \cdot rb \cdot \omega^2 \cdot \{-\cos(\theta - \beta)\sin\alpha\}$$

Furthermore, if the mass Ma, Mb of reciprocating parts is equalized and the radii ra, rb of rotation of the first and second crank pins 11 and 12 are also equalized, then the composite force Fx of the primary inertia force in the direction of X axis can be expressed as follows:

$$Fx = Ma \cdot ra \cdot \omega^2 \cdot \cos\theta - Mb \cdot rb \cdot \omega^2 \cdot \cos(\theta - \beta)\cos\alpha$$
$$\phantom{Fx} = Ma \cdot ra \cdot \omega^2 \cdot \{\cos\theta - \cos(\theta - \beta)\cos\alpha\}$$

Also, the composite force Fy of the primary inertia force in the direction of Y axis can be expressed as follows:

$$Fy = Mb \cdot rb \cdot \omega^2 \cdot \{-\cos(\theta - \beta)\sin\alpha\}$$
$$\phantom{Fy} = Ma \cdot ra \cdot \omega^2 \cdot \{-\cos(\theta - \beta)\sin\alpha\}$$

Accordingly, the absolute value of the vector $\vec{F}$ combining the X axis component Fx and the Y axis component Fy of the aforementioned primary inertia force is as follows:

$$|\vec{F}|^2 = (Ma \cdot ra \cdot \omega^2)^2 \cdot [\{\cos\theta - \cos(\theta - \beta)\cos\alpha\}^2 + \{-\cos(\theta - \beta)\sin\alpha\}^2]$$

If $Z = \dfrac{|\vec{F}|^2}{(Ma \cdot ra \cdot \omega^2)^2}$, then $Z = \{\cos\theta - \cos(\theta - \beta)\cos\alpha\}^2 + \{\cos(\theta - \beta)\sin\alpha\}^2$
$= \{\cos\theta - (\cos\theta\cos\beta + \sin\theta\sin\beta)\cos\alpha\}^2 + \{(\cos\theta\cos\beta + \sin\theta\sin\beta)\sin\alpha\}^2$ If it is assumed that $\sin\alpha = r$, $\cos\alpha = S$, $\sin\beta = P$ and $\cos\beta = Q$,
then, $Z = \{\cos\theta - (Q\cos\theta + P\sin\theta)S\}^2 + \{(Q\cos\theta + P\sin\theta)\}R^2$
$= \{\cos^2\theta - 2(Q\cos\theta + P\sin\theta)S\cos\theta + (Q\cos\theta + P\sin\theta)^2S^2 + (Q\cos\theta + P\sin\theta)^2R^2$
$= \cos^2\theta - 2(Q\cos\theta + P\sin\theta)S\cos\theta + (Q\cos\theta + P\sin\theta)^2 (S^2 + R^2)$
$= \cos^2\theta - 2(Q\cos\theta + P\sin\theta)S\cos\theta + (Q\cos\theta + P\sin\theta)^2$
$= (1 - 2QS + Q^2)\cos^2\theta - 2(PS - PQ)\sin\theta\cos\theta + P^2(1 - \cos^2\theta)$
$= (1 - 2QS + Q^2 - P^2)\cos^2\theta + 2P(Q - S)\sin\theta\cos\theta + P^2$
$= \tfrac{1}{2}(2QS - 2Q^2)(\cos 2\theta + 1) + P(Q - S)\sin 2\theta + P^2$
$= Q(Q - S)(\cos 2\theta + 1) + P(Q - S)\sin 2\theta + P^2$ In order to balance the aforementioned primary inertia force, i.e., the composite vector $\vec{F}$, the following conditions must be met simultaneously.
  (1) The magnitude of $\vec{F}$ ($|\vec{F}|$), i.e., Z, must be fixed.
  (2) The direction and velocity of rotation of $|\vec{F}|$ must be those of the crankshaft 5.

Therefore, an examination shall be made first with respect to the first condition, $Z \equiv k$ (k: constant).
First, the formula:

$$Z = Q(Q - S)\cos 2\theta + P(Q - S)\sin 2\theta + Q(Q - S) + P^2 \equiv k$$

shall be transformed as follows:

$Q(Q-S)\cos 2\theta + P(Q-S)\sin 2\theta \equiv k - Q(Q-S) - P^2$

If in this stage are provided the following three conditions:

$$\sqrt{Q^2(Q-S)^2 + P^2(Q-S)^2} = t$$
$$Q(Q-S) = t\sin\phi$$
$$P(Q-S) = t\cos\phi$$

there is achieved the following transformation:

$$Q(Q-S)\cos 2\theta + P(Q-S)\sin 2\theta$$
$$= t\cos 2\theta \sin\phi + t\sin 2\theta \cos\phi$$
$$= t\sin(2\theta + \phi) \equiv k - Q(Q-S) - P^2$$

If the above equation is to be held irrespective of the value of $\theta$, then the condition of $t=0$ must be satisfied. Therefore, $$Q^2(Q-S)^2 + P^2(Q-S)^2 = (Q-S)^2(Q^2+P^2) = 0$$

Since $$Q^2 + P^2 = \cos^2\beta + \sin^2\beta$$

$$Q - S = 0$$

$$\therefore \cos\beta = \cos\alpha$$

$$\therefore \beta = \pm\alpha + 2\pi \times n$$

If it is assumed that $\beta = \alpha + 2\pi n$, $$\frac{Fx}{Fy} = \frac{Ma \cdot ra \cdot \omega^2 \cdot \{\cos\theta - \cos(\theta - \beta)\cos\alpha\}}{Ma \cdot ra \cdot \omega^2 \cdot \{-\cos(\theta - \beta)\sin\alpha\}}$$

$$= \frac{\cos\theta - \cos(\theta - \alpha)\cos\alpha}{-\cos(\theta - \alpha)\sin\alpha}$$

$$= \frac{\cos\theta - \cos\theta\cos^2\alpha - \sin\theta\sin\alpha\cos\alpha}{-\cos(\theta - \alpha)\sin\alpha}$$

$$= \frac{\cos\theta(1 - \cos^2\alpha) - \sin\theta\sin\alpha\cos\alpha}{-\cos(\theta - \alpha)\sin\alpha}$$

$$= \frac{(\cos\theta\sin\alpha - \sin\theta\cos\alpha)\sin\alpha}{-\cos(\theta - \alpha)\sin\alpha}$$

$$= \frac{-\sin(\theta - \alpha)\sin\alpha}{-\cos(\theta - \alpha)\sin\alpha}$$

$$= \frac{\sin(\theta - \alpha)}{\cos(\theta - \alpha)} = \tan(\theta - \alpha)$$

Therefore, the rotational direction and the angular velocity of the composite vector $\vec{F}$ becomes the same as those of the crankshaft 5 when $\beta = \alpha + 2\pi n$.

Also, if it is assumed that $\beta = -\alpha + 2\pi n$, $$\frac{Fx}{Fy} = \frac{Ma \cdot ra \cdot \omega^2 \cdot \{\cos\theta - \cos(\theta - \beta)\cos\alpha\}}{Ma \cdot ra \cdot \omega^2 \cdot \{-\cos(\theta - \beta)\sin\alpha\}}$$

$$= \frac{\cos\theta - \cos(\theta + \alpha)\cos\alpha}{-\cos(\theta + \alpha)\sin\alpha}$$

$$= \frac{\cos\theta - \cos\theta\cos^2\alpha + \sin\theta\sin\alpha\cos\alpha}{-\cos(\theta + \alpha)\sin\alpha}$$

$$= \frac{\cos\theta(1 - \cos^2\alpha) + \sin\theta\sin\alpha\cos\alpha}{-\cos(\theta + \alpha)\sin\alpha}$$

$$= \frac{(\cos\theta\sin\alpha + \sin\theta\cos\alpha)\sin\alpha}{-\cos(\theta + \alpha)\sin\alpha}$$

$$= \frac{\sin(\theta + \alpha)}{-\cos(\theta + \alpha)} = -\tan(\theta + \alpha)$$

$$= \tan(-\theta - \alpha)$$

Therefore, the rotational direction and the angular velocity of the composite vector $\vec{F}$ is opposite in direction to those of the crankshaft 5 when $\beta = -\alpha + 2\pi n$.

Also, when $\beta = \alpha + 2\pi n$, the absolute value of the composite vector $\vec{F}$ is as follows:

$$|\vec{F}|^2 = (Ma \cdot ra \cdot \omega^2)^2[\{\cos\theta - \cos(\theta - \beta)\cos\alpha\}^2 + \{-\cos(\theta - \beta)\sin\alpha\}^2]$$
$$= (Ma \cdot ra \cdot \omega^2)^2[\{\cos\theta - \cos(\theta - \alpha)\cos\alpha\}^2 + \{-\cos(\theta - \alpha)\sin\alpha\}^2]$$
$$= (Ma \cdot ra \cdot \omega^2)^2[(\cos\theta - \cos\theta\cos^2\alpha - \sin\theta\sin\alpha\cos\alpha)^2 + \{\cos(\theta - \alpha)\sin\alpha\}^2]$$
$$= (Ma \cdot ra \cdot \omega^2)^2[\{\cos\theta(1 - \cos^2\alpha) - \sin\theta\cos\alpha\sin\alpha\}^2 + \cos^2(\theta - \alpha)\sin^2\alpha]$$
$$= (Ma \cdot ra \cdot \omega^2)^2\{\sin^2(\theta - \alpha)\sin^2\alpha + \cos^2(\theta - \alpha)\sin^2\alpha\}$$
$$= (Ma \cdot ra \cdot \omega^2)^2\sin^2\alpha$$

It can be seen from the above that the elimination of the primary vibration resulting from the mass of the reciprocating parts by attaching a balancer weight to the crankshaft 5 can be achieved only when $\beta = \alpha + 2\pi n$. Hence, this can be achieved by offsetting the phase of the second crank pin 12 against the first crank pin 11 by $\pi - (\alpha + \beta)$, that is, $\pi - 2\alpha$ in the direction opposite to the direction of the central axis 4a of the cylinder 16 from the central axis 3a of the cylinder 15, and by adding the balancer weight 31 having the same magnitude as the composite vector $\vec{F}$ to the crankshaft 5 in such a way as to offset the phase of its center of gravity by $\pi$ from the composite vector $\vec{F}$, namely, on the opposite side of the composite vector $\vec{F}$.

Figure 3:
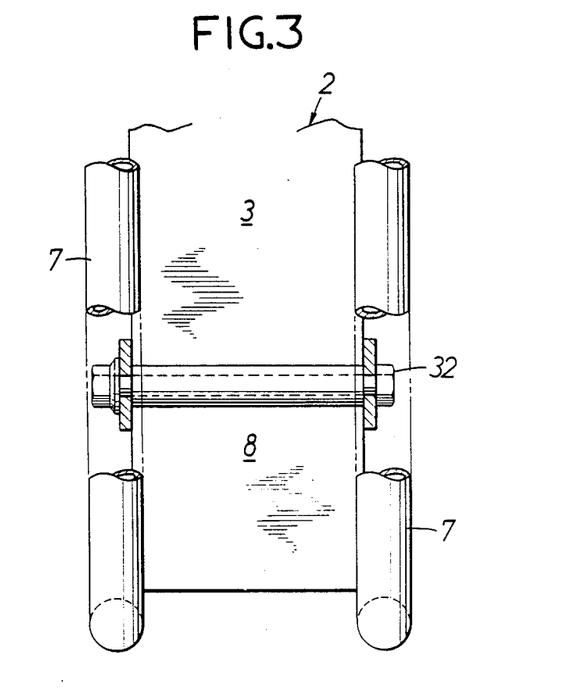
FIG. 3 is a partially enlarged view illustrating how the engine is mounted on the frame.

According to the construction described hereinbefore, the vibration of the engine 2 can be attenuated substantially so that the engine 2 can be mounted simply rigidly on the frame by means of a fixing means 32 such as a bolt, as shown in FIGS. 1 and 3, without resorting to conventional rubber mounting method.

In the foregoing embodiment, two engine blocks 3, 4 are disposed in a V shape along the longitudinal direction of the chassis, but they may be disposed in a V shape in the direction transverse to the chassis.

It is to be noted also that the invention can be applied not only to V-type twin cylinder engines but also to V-type multi-cylinder engines having more than two cylinders arranged in a form like V.

What is claimed is:

1. A V-type multi-cylinder engine for motorcycles, including first and second engine blocks arranged on a frame so as to form a V shape, said engine blocks having first and second cylinders, respectively, pistons reciprocatably and slidably received by said first and second cylinders, and a crankshaft having first and second crank pins connected through piston rods to said pistons, wherein the improvement comprises that the rotational phase of said second crank pin is offset from that of said first crank pin by an angle $\pi - 2\alpha$ in the opposite side of the central axis of said first cylinder to the axis of said second cylinder, $\alpha$ representing an angle included between the central axes of said first and second cylinders, and that a balancer weight is attached to that portion of said crank shaft positioned opposite to said first and second crank pins and on the bisector line of the angle formed between said crank pins around said crankshaft.

2. A V-type multi-cylinder engine for motorcycles as set forth in claim 1, wherein said first and second engine blocks are arranged on the frame of said motorcycle in the longitudinal direction thereof.

3. A V-type multi-cylinder engine for motorcycles as set forth in claim 1 or 2, wherein the included angle between the central axes of said first and second cylinders is smaller than 90°.

4. A V-type multi-cylinder engine for motorcycles as set forth in claim 3, wherein the included angle between the central axes of said first and second cylinders is 45°.

5. A V-type multi-cylinder engine for motorcycles as set forth in either one of claims 2, wherein said frame includes a downtube having first and second portions, the first portion extending downwardly and the second portion extending rearwardly with respect to a head pipe supporting a steering axle, and wherein said engine blocks are disposed in a space to the rear of the first portion and above the second portion of said downtube.

6. A V-type multi-cylinder engine for motorcycles as set forth in claim 5, wherein said first and second engine blocks are arranged in symmetry with each other with respect to a vertical plane passing through the axis of rotation of said crankshaft.

7. A V-type multi-cylinder engine for motorcycles as set forth in any one of claims 1 or 2, wherein said engine blocks are rigidly fixed to said frame.

8. A V-type multi-cylinder engine for motorcycles as set forth in claim 5, wherein said first and second cylinders in said first and second engine blocks are arranged symmetrically with respect to the longitudinal axis of said frame at equal distances offset sidewardly from that axis.

9. A V-type multi-cylinder engine for motorcycles as set forth in claim 8, further comprising valve actuating cam shafts rotatably carried by said first and second engine blocks, respectively, driven sprockets attached to said valve actuating cam shafts, respectively, driving sprockets fixed to both ends of said crankshaft, and endless timing chains engaging respective combinations of said driving and driven sprockets.

10. A V-type multi-cylinder engine for motorcycles as set forth in claim 5, wherein said first cylinder is positioned closer to said downtube than said second cylinder and the axis of said first cylinder is parallel to the first portion of said downtube.

* * * * *